OR  3,873,188

United States
Baeker

[11] 3,873,188
[45] Mar. 25, 1975

[54] ALIGNING MEANS FOR INCREMENTAL LENSES
[75] Inventor: Robert B. Baeker, Columbia, Mo.
[73] Assignee: Minnesota Mining and Manufacturing Company, St. Paul, Minn.
[22] Filed: Mar. 29, 1973
[21] Appl. No.: 346,001

[52] U.S. Cl. ................ 350/211, 350/178
[51] Int. Cl. .................. G02b 3/08, B29d 11/00
[58] Field of Search ........ 350/211, 178; 264/1, 2; 425/808

[56] References Cited
UNITED STATES PATENTS
2,443,390  6/1948  Kingston .................. 425/808
3,409,348  11/1968  Annis et al. ............... 350/254
3,580,663  5/1971  Hicks ...................... 250/211

*Primary Examiner*—Ronald L. Wibert
*Assistant Examiner*—Conrad Clark
*Attorney, Agent, or Firm*—John C. Barnes

[57] ABSTRACT

Optical lenses formed with incremental surfaces of the Fresnel-type to provide for the direction of light can be used in pairs to provide lenses of specific power. It is necessary to align the optic axis of these lens pairs however and this may be accomplished by forming on one lens at positions spaced 90° about the circumference of the lens a V-shaped groove and forming on the other of the lenses a mating rib in respective positions such that the opposed rib and groove when mated at all four positions will align the axis.

3 Claims, 4 Drawing Figures

3,873,188
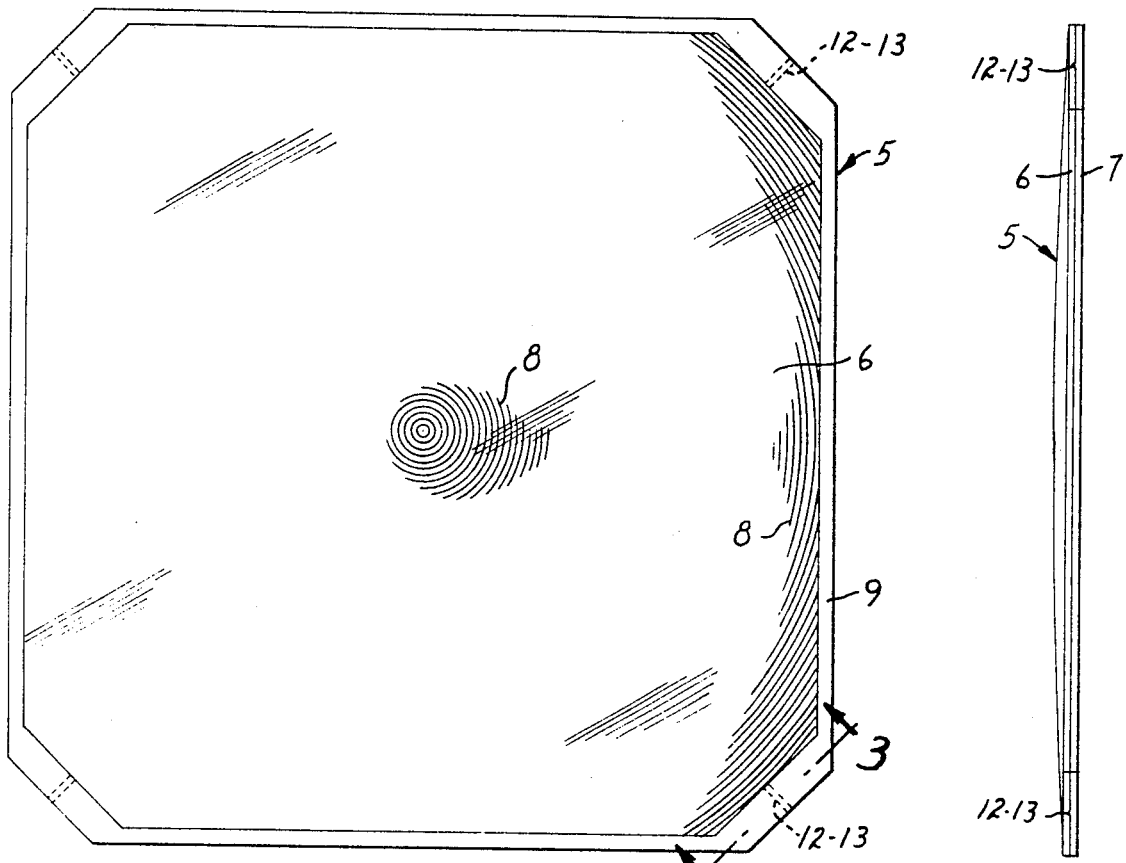
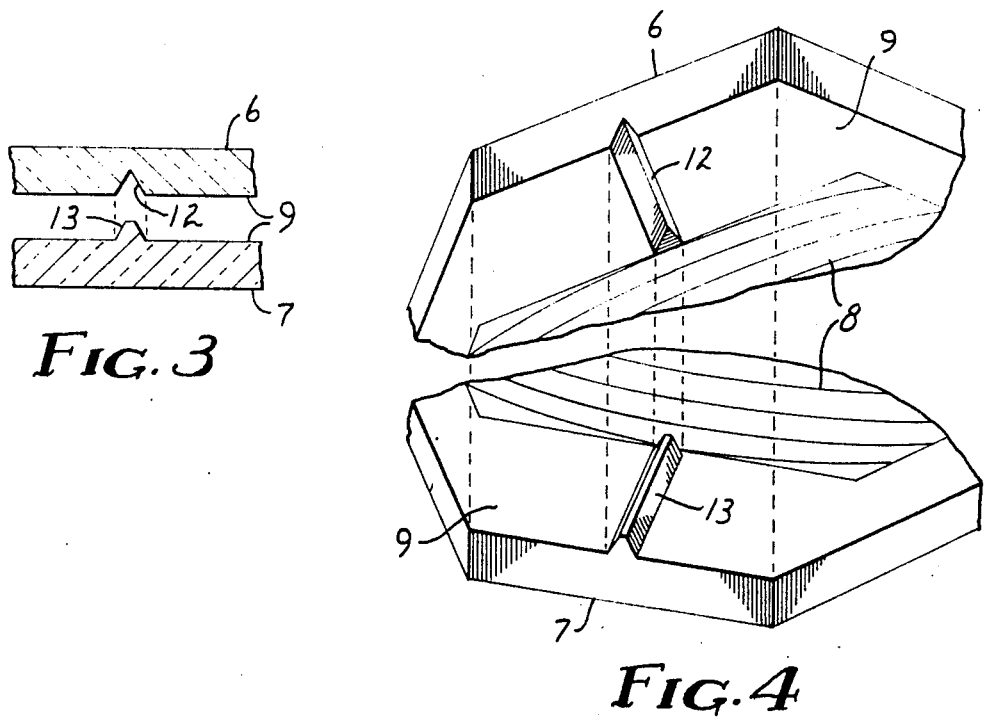

ALIGNING MEANS FOR INCREMENTAL LENSES

BACKGROUND OF THE INVENTION

This invention relates to a system for aligning axially a compatible set of lenses of the Fresnel-type.

The present invention provides a pair of lenses which will be compatible to afford a specific optic result with the optic axis of each lens element coaxially positioned.

DESCRIPTION OF THE PRIOR ART

Previous to the present invention the axes of incremental lenses have been aligned by placing a pair of lenses at an optical bench and aligning the same by manual means. This system required the viewing through a lens to magnify the centers and locate the optic axis of each of the elements and place the same in alignment and then gently close the press with the lenses aligned to clamp the same together for subsequent sealing. Another system for aligning the lenses required that the ridges and grooves forming the incremental surface of the lens had to be formed such that the ribs on one lens would be received within the grooves on the other lens, first on one side of the peaks of the ridges away from the center and then on the other side of the peaks, such that by placing the same in contact and applying pressure the lenses tend to align themselves. The lenses could then be sealed about their edges.

In a lens such as that of the present invention where the ridges and grooves of the respective lenses are not so formed that they will be in alignment upon contact, alignment can only be formed by manually checking each lens to place the same on an optic axis and then clamping the same together.

The present invention provides a mechanical means for automatically optically aligning the lenses. The lens of the present invention is formed from a pair of lens elements to provide the lens the desired power each having a substantially sheet-like appearance and formed on one surface with the concentric ridges and grooves, the walls defining the same providing refraction of light passing through the lens. Each of said pair of lens members having on one face at four positions, spaced radially from the axis and spaced circumferentially on radial lines 90° apart, one of a V-shaped groove, i.e. V-shaped in cross section, or a mating rib, in opposed relationship to a cooperating groove or rib on the other of said lens members. The grooves and ribs are spaced the same radial distance from the axis of the lens member with the grooves having a dimension along the radius exceeding that of said rib. The V-grooves and ribs are preferably located in the corners of the lens when the same is cut to have a square pattern such as illustrated in this application and as used most conventionally on overhead projectors.

DESCRIPTION OF THE DRAWING

This invention will be further described with reference to the accompanying drawing wherein:

FIG. 1 is a plan view of a lens formed of a pair of polymeric incremental lens members;

FIG. 2 is a side view of the lens of FIG. 1;

FIG. 3 is a detail sectional view taken along the lines 3—3 of FIG. 1; and

FIG. 4 is fragmentary perspective view of one lens member raised from the other lens member at a corner.

DESCRIPTION OF THE PREFERRED EMBODIMENT

The present invention provides a system for assembling a pair of molded or pressed lens members in an optically and axially aligned position. The lens 5 comprises a pair of thin lens members 6 and 7 each produced by stamping to form on one surface of the lens member a plurality of concentric circular ridges 8 one wall of each ridge being positioned at a predetermined angle to refract light in a prescribed manner. The ridges of the lens members 6 and 7 are positioned in opposed relation with the opposite surfaces of each of the members being smooth. The lens members have a rectangular configuration with a border 9 being formed around the refracting surface of each lens member. At the corners the borders are larger and the corners are truncated as viewed in FIG. 1.

On the face of the lens members formed with the light refracting ridges, at each of four positions, spaced radially from the axis and spaced circumferentially about the axis on radial lines that are 90° apart, is a V-shaped groove 12 or a mating rib 13. These grooves and ribs are provided such that they may engage one another causing an axial alignment of the optic axis of each of the lens members. These grooves and ribs are formed during the stamping of the lenses as a result of the precision made dies for stamping the lenses. The groove 12 on one of the lens members has a longer radial dimension than the cooperating rib 13 on the other lens member. Thus, the groove 12 will always be long enough to accommodate the rib 13.

The lens elements 6 and 7 are individually stamped from a pair of stamping dies which are precision-formed with concentric circular ridges or rings to form the light refracting ridges on the lens.

One stamped lens from each of the stamping dies is thus placed in position with the embossed surface of each member in opposed relationship. The lens members 6 and 7 are then aligned to align the edges and the same are placed in juxtaposition to position the ribs 13 in the opposing grooves 12 on the other of said lens members. As the four sets of ridges and grooves engage the lens members are automatically brought to an optically and axially aligned position. The lenses are then sealed together about the edge of the lenses at the border 9. The sealing may be effected by the use of a solvent for the polymeric material from which the lenses are made or by the use of a suitable adhesive composition. They may also be sealed by fusion. The corners of the lenses may be truncated after assembly.

The edge sealing generally hermetically seals the spacing between the lens members formed by the opposed concentric light refracting rings such that the optical quality of the lens is preserved.

The four aligning grooves 12 may be formed on one lens member and the ribs 13 may be formed on the other or two grooves and two ribs on each, or another combination and not depart from the spirit of this invention as long as the depth or height of each allows the proper positioning of the lenses in contact.

Having thus described the present invention with respect to the preferred embodiment what is claimed is:

1. A lens comprising a pair of polymeric, incremental lens members each of the Fresnel-type in juxtaposition and sealed together at the edge, said lens members being aligned to dispose the optic axis of the refracting increments coaxially, and each of said pair of lens members having on a face at four positions, spaced radially from the axis and spaced circumferentially on radial lines 90° apart, one of a V-groove or mating rib extending in a radial direction and in opposed relationship to a cooperating groove or rib on the other lens member.

2. A lens according to claim 1 wherein
the refracting incremental ridges of the lens members are in opposed relationship,
the lens members are rectangular,
the grooves and ribs are disposed at the corners of the lens members, and
the lens members are sealed about their entire circumference.

3. A method of aligning the optic axis of a pair of flat incremental lens members each of which is formed with a radially extending V-groove or mating rib at each of four positions, spaced radially from the axis of the lens member and spaced circumferentially on radial lines 90° apart, to mate with a groove or rib similarly located on the other lens member, comprising the steps of:
placing said lens members in juxtaposition with grooves and ribs in opposed relationship,
engaging the ribs with the grooves at all four positions about the circumference of the lens, and
sealing the lens members together at the edge, whereby the optic axis of the two lens member are coaxial.

* * * * *